United States Patent Office 2,984,548
Patented May 16, 1961

2,984,548

HYDROGEN SULFIDE CONVERSION

Lester G. Massey, Arlington Heights, Ill., assignor, by mesne assignments, to Universal Oil Products Company, Des Plaines, Ill., a corporation of Delaware No Drawing. Filed Dec. 30, 1957, Ser. No. 705,832

3 Claims. (Cl. 23—212)

This invention relates to a method for converting hydrogen sulfide to sulfur and hydrogen and to a combination process wherein hydrogen sulfide contained as a contaminant in a hydrogen gas stream is converted to hydrogen and readily-separated sulfur.

In one embodiment, this invention relates to a method for decomposing hydrogen sulfide into hydrogen and sulfur which comprises passing a mixture of hydrogen sulfide and hydrogen over glowing tungsten.

In another embodiment, this invention relates to a process for removing a hydrogen sulfide impurity from a hydrogen-containing gas stream by passing said stream over glowing tungsten to convert hydrogen sulfide to hydrogen and sulfur and separately recovering sulfur.

It has been found that hydrogen sulfide may be converted to hydrogen and elemental sulfur when it is passed over glowing tungsten. It has furthermore been found that when hydrogen sulfide is so decomposed into its elements that the glowing tungsten, when used in a filament form, is rapidly destroyed when the process is effected without the presence of molecular hydrogen in the feed mixture. No definite reason can be assigned for this effect, however, it is thought that the decomposition of hydrogen sulfide is effected by atomic hydrogen produced at the glowing tungsten filament and the action of the atomic hydrogen produces the decomposition. The decomposition may be effected thermally by local high temperatures at the point where 2 atoms of atomic hydrogen recombine to form a molecule or it may be effected by the reaction of two atoms of hydrogen with the atoms of hydrogen which are combined with sulfur in the form of hydrogen sulfide. Whatever the mechanism of the reaction, it has been found that when molecular hydrogen is mixed with the hydrogen sulfide, the hydrogen apparently forms a shielding layer of molecular or atomic hydrogen in the immediate vicinity of the filament, which prevents sulfur from contacting and combining with the filament to cause its rapid destruction. As will be hereinafter demonstrated, the presence of molecular hydrogen in the hydrogen sulfide stream is necessary to produce a continuous process.

The process of this invention may be employed merely for the purpose of producing elemental sulfur from hydrogen sulfide and when so employed, it produces an extremely pure form of solid phase sulfur and a by-product of extremely pure hydrogen. The process may be effected by mixing hydrogen sulfide from any source with hydrogen and passing the resultant mixture in the form of a flowing stream over one or several glowing tungsten elements. The process may also be performed by introducing batches of hydrogen and hydrogen sulfide mixture into suitable vessels and subjecting them in these vessels to the action of glowing tungsten. A continuous process is preferable and easy to perform since the hydrogen produced is a gas and the sulfur is either a solid or a liquid depending upon the temperature of the operation. The hydrogen employed to dilute the hydrogen sulfide may easily be completely recovered and may be at least partly recycled to the process.

This process may be extremely useful even when sulfur is not necessarily the end product of the process. For example, many industrial processes produce hydrogen sulfide as a waste material which must be disposed of. Venting hydrogen sulfide to the atmosphere creates a nuisance because of its unpleasant odor and toxic characteristics and this nuisance frequently must be abated by using expensive means for removing hydrogen sulfide from the waste gas. The process of this invention readily and cheaply removes hydrogen sulfide from such a waste gas stream in the form of solid sulfur which presents no disposal problem and in fact, may be sold commercially in the form of solid sulfur of high purity.

Another important use for the present process is in certain hydrocarbon refining operations. Hydrorefining of materials such as petroleum fractions, coal tars, shale oils, etc. is widely used both for the purpose of improving the characteristics of the fraction as a motor fuel and for removing impurities therefrom. Typical hydrorefining processes include hydrodesulfurization and reforming. For example, hydrodesulfurization may be effected on a hydrocarbon fraction containing sulfur in such combined forms as thiophenes and mercaptans by treating it at a temperature in the range of 500° F. and superatmospheric pressure in the presence of hydrogen to produce a combination of reactions including cracking and hydrogenation that cause the sulfur-bearing molecules to be converted into hydrogen sulfide and the corresponding hydrocarbons. Since hydrogen is necessary to the operation of this process the effluent from the reaction zone is separated into a hydrogen phase and a hydrocarbon phase and the hydrocarbon phase is recovered as desulfurized liquid product while the hydrogen phase is recycled to the reaction zone. The process is effected in the presence of a metallic catalyst such as platinum, palladium, iron, cobalt, molybdenum, nickel, etc. or combinations of these such as cobalt-molybdenum usually in a lower oxide or sulfide form and dispersed as fine particles upon an inert refractory oxide carrier such as silica, alumina, etc. Although many of these catalysts are not unduly sensitive to sulfur, an overabundance of sulfur will cause the catalyst to lose activity and it is accordingly desirable to remove sulfur from the reaction zone as much as possible. Since the sulfur content of the feed stock cannot be changed, it is frequently necessary to reduce the catalyst exposure to sulfur by removing hydrogen sulfide from the recycle gas and for this purpose, the process of this invention in combination with a hydrorefining process is extremely beneficial. Hydrogen sulfide presently is removed from recycle gas streams by absorbing it from the gas stream by scrubbing the gas with an aqueous alkaline medium. Preferably, the alkaline medium is regenerable and may consist of such materials as diethanolamine which forms a loose chemical association with hydrogen sulfide to remove it from the recycle gas stream and which may be removed from contact with the gas stream, heated to drive off hydrogen sulfide and returned to contact with the gas stream in regenerated condition. Although this process effectively removes hydrogen sulfide from the gas stream, it does so by contacting the gas stream with an absorbing medium, then regenerating the absorbing medium to separate hydrogen sulfide from it and then circulating the restored absorbing medium back into contact with the gas stream. In addition to requiring all of these steps the hydrogen sulfide recovered is a noxious, difficult-to-dispose-of gas and each atom of sulfur which is removed from the process takes two atoms of valuable hydrogen combined with it. Other difficulties are that the aqueous absorbing medium contaminates the recycle gas with absorbing medium and with water vapor which must subsequently be either removed or endured at the cost of diminished catalyst activity.

The process of this invention removes hydrogen sulfide from the circulating gas stream or from a $H_2S$-rich gas stream extracted from the circulating hydrogen stream simply by passing it over one or several glowing tungsten elements. These elements may be filaments caused to glow electrically so that no cumbersome heating equipment is necessary and the hydrogen sulfide is removed by converting it to sulfur in either the liquid or the solid state which may easily be removed as a phase separate from the circulating gas stream. Furthermore, when the hydrogen sulfide is removed, it does not present a new disposal or toxicity problem because it is in the form of solid, non-obnoxious, and commercially useful sulfur. In addition, all of the hydrogen in the system is recovered since the sulfur is removed free of combined hydrogen which, therefore, conserves an expensive raw material to the process.

Another hydrorefining process in which the process of this invention is useful is the reforming process wherein a hydrocarbon fraction boiling in the gasoline, naphtha or kerosene range is contacted at a temperature in excess of about 850° F. and at superatmospheric pressure with a catalyst comprising platinum, alumina and preferably some combined halogen which promotes reactions that improve the characteristics of the fraction as a motor fuel. The primary reactions of a reforming process are dehydrogenation of cyclic paraffinic compounds to produce aromatic compounds, destructive hydrogenation of larger molecules to produce smaller molecules, cyclization of paraffinic molecules and isomerization of straight-chain molecules to produce more highly branched molecules. All of these reactions result in improved motor fuel characteristics. Reforming reactions furthermore cause the saturation of olefins and the hydrodesulfurization of sulfur-bearing molecules. In reforming reactions, the catalyst employed is very sensitive to sulfur. When the sulfur content of the charge stock is high, a desulfurization process such as the one heretofore described may be necessary to bring the sulfur level of the charge down to a level at which the catalyst in the reforming reaction can tolerate it. When the sulfur content is not too high, the reforming reaction may be effected with sulfur removal from the recycle gas so that the catalyst is exposed only to the combined sulfur in the charge to the process. It is readily seen that the process of this invention employed to remove hydrogen sulfide from the circulating hydrogen stream of a reforming process is an extremely useful means for improving the operation of the reforming process.

In many combination processes such as a combination hydrorefining and reforming process, a hydrorefining and hydrocracking process or a reforming and hydrocracking process, the process of this invention may find great utility for purifying the various streams passing between the elements of the combined processes. Therefore, when it is desired to reform a high sulfur feed stock it may first be necessary to hydrorefine it so that the sulfur content of the liquid is diminished. In most such hydrorefining-reforming combination processes it is necessary to pass the normally liquid petroleum product serially first through the hydrorefining stage and then through the reforming stage but to have each stage with an independent recirculating gas system. The alternative to the above flow is to have a gas purifying means disposed between the processes so that the gas stream may also flow in series through the process. The present invention disposed between the processes will provide a simple, low cost, gas purifying means which does not require reducing the temperature or the pressure of the gas stream or the introduction of any extraneous stream such as solvent, caustic reactant, etc, to effect the removal of hydrogen sulfide.

Employing the present invention with a combination hydrorefining-hydrocracking process, the feed stock may be hydrorefined to remove sulfur from the liquid phase thereof and passed to a hydrocracking zone, however, the present invention, employed to remove sulfur from the normally gaseous material of the hydrorefining zone provides an extremely suitable hydrogen source for the hydrocracking process whereby the catalyst is not adversely effected and the product is substantially free of sulfur.

The uses hereinbefore described are intended to be illustrative rather than limiting upon the process which in its broad scope provides for conversion of hydrogen sulfide to its elements by treatment with glowing tungsten in the presence of hydrogen.

As hereinbefore stated, the process of the present invention may be effected with simple low cost apparatus that may readily be installed in already existing equipment. The glowing tungsten means employed in the invention may be dispersed in the form of a plug in a conduit through which the hydrogen and hydrogen sulfide gas stream pass or it may be introduced into an enlarged portion of a pipe or a chamber that is disposed in a regular flow. The invention may be used in conjunction with a coalescing means which accumulates the sulfur which is produced so that it may be discharged from the system. The coalescing means may be electrostatic or centrifugal particle separators when the temperature of the operation is such that liquid or solid sulfur is produced. Depending upon the velocity of the stream and the character of the sulfur produced, the coalescing means may comprise a filter, a condenser when vapor phase sulfur is produced, a dip leg which bubbles through a liquid sulfur bath, an impingement plate or whatever other means is required to effect the removal of sulfur from the gas stream as a separate phase. A particularly useful apparatus arrangement may comprise a glowing tungsten filament disposed at the opening of a conduit into an enlarged chamber so that elemental sulfur is discharged into the enlarged chamber as it is formed. The chamber will cause a reduction in the velocity of the gas stream which will promote settling of the sulfur and to aid the settling the conduit may discharge downwardly impinging against a bath of liquid sulfur which may be maintained by adding heat when insufficient heat is present. The low velocity stream within the chamber may be subjected to the action of a second glowing tungsten filament or more when required to effect the decomposition of all of the hydrogen sulfide. When employed in high pressure applications, it is preferred that the sulfur product be recovered as a liquid to promote easy withdrawal of the same from the system by means of a valve and a liquid level control.

Following are several examples which illustrate one mode of effecting the process of this invention and the necessity for all of the elements of the invention to be present.

*Example I*

A tungsten filament taken from a 200 watt lightbulb was disposed in a glass conduit and electrically connected to a source of 115 volt energy. A mixture of 30% hydrogen sulfide and the remainder cylinder hydrogen was passed through the glass conduit. After sufficient purging with the gas mixture to remove all oxygen from the vicinity of the filament, a voltage of 5 volts was imposed across the filament. No effect was observed at 5 volts so the voltage was increased in increments of 5 volts. At 10 volts a slight glowing occurred in the filament which became increasingly brighter as the voltage increased and at 40 volts a yellow cloud in the vicinity of the filament was observed. As the voltage was increased, the density of the cloud became greater and solid yellow material began depositing on the inner surface of the glass conduit everywhere downstream of the filament except in the immediate vicinity thereof where melting and eventual vaporization of the yellow material was occurring. The yellow material was collected in a cold trap downstream of the filament and when analyzed it was found to be sulfur.

*Example II*

The apparatus of Example I was employed in a stream consisting of 100% hydrogen sulfide. At 5 volts no reaction occurred and as the voltage was increased, at about 40 volts a yellow cloud was observed, however, within 45 second the filament burned out. This experiment was repeated several times and on each occasion when no hydrogen was present in the gas stream the filament life was limited to less than a minute even at minimum operating conditions where decomposition could take place.

Although the above examples deal with glowing tungsten filaments which are electrically energized, it is not intended to limit the invention to that species. It is contemplated that tungsten as a screen, a bed of packed particles, a plate of sintered particles or in other forms may be used and that it may be energized to incandescence by indirect heating or by any other energy source. It is also contemplated that the process of this invention may be modified when used with different processes which have special characteristics. For example, when complete hydrogen sulfide removal is required, the process may be used as a multi-stage, it may be used with recycle of surface streams, it may be used in conjunction with other sulfur removal processes, etc. When oxygen or other oxidizing material is present the tungsten will preferably be in a form other than a thin filament so that it will not be destroyed by a small amount of oxidation.

I claim as my invention:

1. The method for decomposing hydrogen sulfide into hydrogen and sulfur which comprises passing a feed mixture of a major proportion of molecular hydrogen and a minor proportion of hydrogen sulfide in a continuous flowing stream over glowing tungsten.

2. The method for decomposing hydrogen sulfide into hydrogen and sulfur which comprises passing a feed mixture of a major proportion of molecular hydrogen and a minor proportion of hydrogen sulfide in a continuous flowing stream over an electrically heated tungsten filament.

3. The method for purifying a hydrogen gas contaminated with hydrogen sulfide which comprises passing said hydrogen gas in a continuous flowing stream over glowing tungsten whereby said hydrogen sulfide is decomposed and separately recovering elemental sulfur therefrom.

References Cited in the file of this patent

UNITED STATES PATENTS 2,697,064     Brown _____ Dec. 14, 1954

OTHER REFERENCES

Mellor: Comprehensive Treatise on Inorganic and Theoretical Chemistry, vol. 11, page 731, Longmans, Green and Co., N.Y., 1931.

Kingman: "Trans. Faraday Soc.," 32, 903–907 (1936).

Taylor, et al.: "J. Phys. Chem.," 31, 1212–19 (1927).

Mellor's Modern Inorganic Chemistry, revised edition, 1951, page 451, Longmans, Green and Co., N.Y.